United States Patent [19]
Anstey

[11] 3,931,609
[45] Jan. 6, 1976

[54] THREE-DIMENSIONAL SEISMIC DISPLAY

[75] Inventor: Nigel A. Anstey, Sevenoaks, England

[73] Assignee: Seiscom Delta, Inc.

[22] Filed: Feb. 11, 1974

[21] Appl. No.: 441,023

[30] Foreign Application Priority Data
Feb. 14, 1973 United Kingdom................ 7187/73

[52] U.S. Cl................ 340/15.5 DS; 35/41; 35/51; 340/15.5 SS; 33/1 HH
[51] Int. Cl.²........................................ G01V 1/00
[58] Field of Search............. 340/15.5 DS, 15.5 SS; 35/41, 51; 33/1 H, 1 HH

[56] References Cited
UNITED STATES PATENTS

| 477,633 | 6/1892 | Barringer | 35/41 |
|---|---|---|---|
| 2,887,791 | 5/1959 | Garbutt | 35/41 |
| 3,137,080 | 6/1964 | Zang | 35/41 |
| 3,212,189 | 10/1965 | Savit | 35/41 |
| 3,230,541 | 1/1966 | Roark et al. | 346/1 |
| 3,243,821 | 3/1966 | Bogs et al. | 346/109 |
| 3,671,929 | 6/1972 | Ruehle et al. | 340/15.5 DP |

*Primary Examiner*—Maynard R. Wilbur
*Assistant Examiner*—S. C. Buczinski
*Attorney, Agent, or Firm*—Pravel & Wilson

[57] ABSTRACT

The present invention relates to a model, and the making of such model, of subsurface features of the earth, utilizing a plurality of processed seismic sections spaced apart in a manner representing the disposition of the seismic profiles along seismic survey lines from which they came. The technique facilitates the making of interpretive geological judgements, and is of particular utility when direct indications of hydrocarbons exist.

26 Claims, 7 Drawing Figures

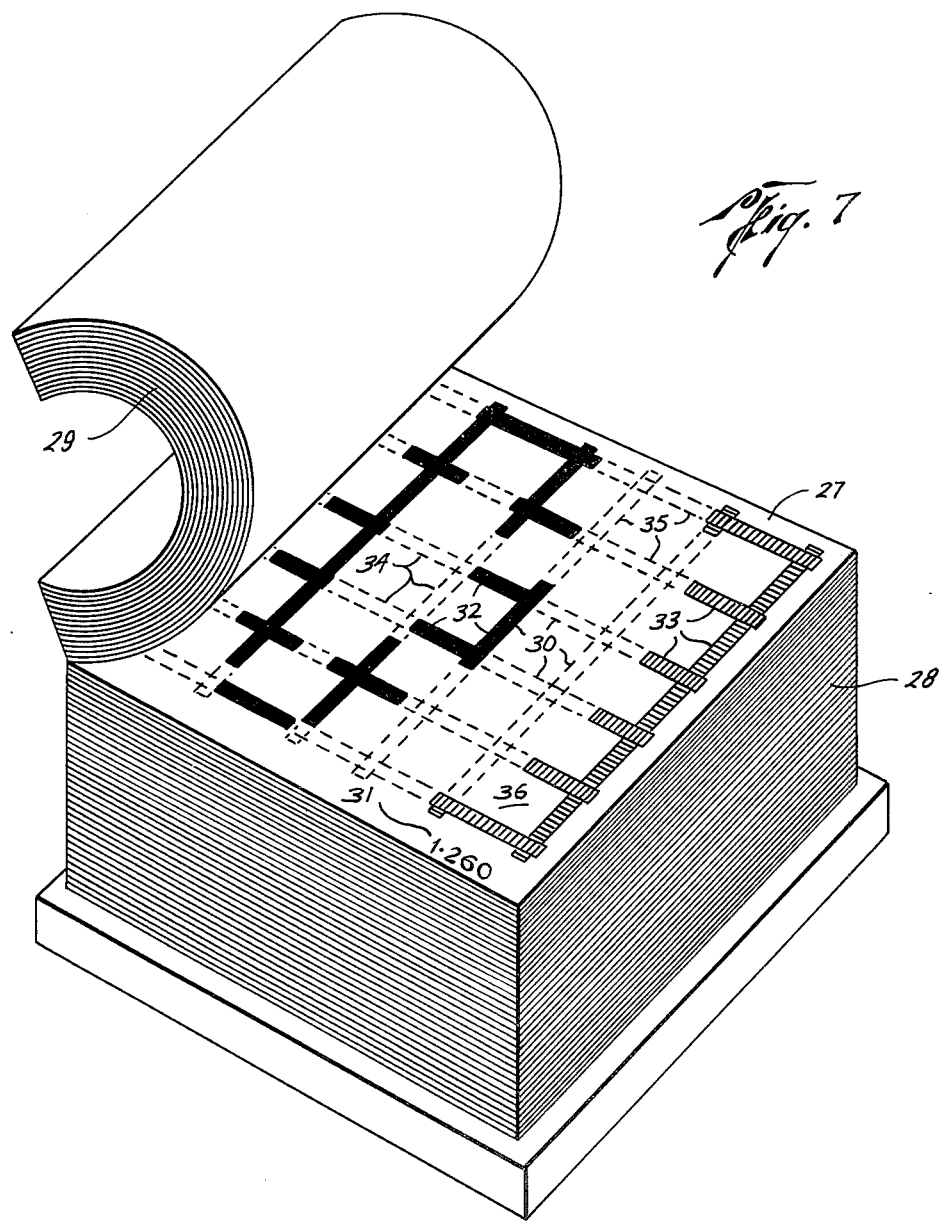

THREE-DIMENSIONAL SEISMIC DISPLAY

BACKGROUND OF THE INVENTION

1. Field of the Invention

The present invention relates to seismic survey and exploration, and to displays representing the results thereof.

2. Description of Prior Art

A typical seismic survey for hydrocarbons is conducted as a series of intersecting profiles along seismic survey lines on a rectangular grid. Each such profile yields a seismic reflection section, which displays, generally to a first approximation, the configuration of the rock interfaces under the line of profile.

In the traditional practice of seismic interpretation, the first operation is to select, or "pick", as the process is known in the art, the reflections which represent these interfaces. This is a process involving considerable judgment, based on knowledge of the regional and local geology. Often the form of a reflection on one or more sections is obscure, and closure of the pick around a loop of the grid is necessary to resolve it. It is therefore common practice to pick each of several reflectors and to check all loop ties before proceeding further.

The next operation is to "time" each of the picked reflections at points spaced at suitable intervals along the surface, and to "post" these times, for each reflector, on maps of the profiles. Suitable contour intervals are then interpolated between the posted times, and a contour map is then constructed for each picked reflector. Perspective views of the contoured surface may then be generated, and numerical integrations may be made to assess volumes.

In the current practice of the art, the timing, posting, contouring and later operations are mechanized using a digitizer, a computer and a computer-controlled plotter. The picking operation, however, remains one which must be done by a skilled person. Decisions must be made on the geological likelihood of one possible interpretation against another, geological faults must be identified by visual character correlation, and a knowledge of the general geological history of the area must be introduced into the picking process. These matters are often very problematical, and their resolution very tedious; each possible interpretation of a difficult segment on one section requires the closing of a loop involving other sections, and each of the latter sections may raise its own ambiguities of interpretation. Furthermore, each reference to another section represents a cumbersome and time-consuming operation, so that the sheer volume of work tends to limit the number of interpretive iterations which can be made.

These difficulties are itensified by the general problem of visualizing three-dimensional subsurface features of the earth from two-dimensional seismic sections. An additional weakness of the traditional practice is that many subtleties which may be present on the seismic sections themselves, and which subtleties may be important to the search for hydrocarbons, are smoothed out in the picking so that their existence is not apparent on the contour map.

SUMMARY OF THE INVENTION

Accordingly, the present invention is directed at a novel and useful type of three-dimensional seismic display which preserves substantially all the relevant seismic data, with a minimum of exclusive judgement being exercised during its formation, until the implications of the totality can be observed.

This novel display also facilitates the picking of seismic horizons around closed loops. It also provides a contour indication as part of the basic display. It also allows geological faults and minor and subtle geological features to be readily included in the interpretation.

Where the seismic sections include the display of a plurality of seismic variables, it also facilitates the areal and three-dimensional correlation of these variables. For example, a seismic variable capable of association with the likelihood of hydrocarbons may be displayed as a color modulation of the individual sections, and the areal extent of a particular color modulation may be taken as indicating the extent and volume of a hydrocarbon accumulation.

The display also facilitates the lateral migration of seismic reflections, to accommodate cross-dip.

In a first embodiment, these advantages are achieved by a method of making a sectionalized model of the earth, comprising the steps of preparing a plurality of seismic reflection sections at a suitable scale, cutting said sections in a manner such that each cut edge is related to the observed configuration of a particular seismic reflection, and disposing and securing said sections in a spatial inter-relation representing the lines of profile from which they were derived.

Supplemental benefits of this method are obtained when the seismic sections include a color modulation representative of particular geological conditions (including the presence of hydrocarbons), and when contour indications are added. Further benefits are obtained if it is desired to provide lateral migration of the seismic reflections, or to make simple measurements of geological volumes, or to provide photographs of perspective views of the geology.

In a second embodiment, the above advantages are achieved by a method of making a sectionalized model of the earth, comprising the steps of preparing a plurality of seismic reflection sections at a suitable scale, cutting said sections into slices along lines of equal reflection time or equal reflection depth, disposing and securing said section slices in a spatial inter-relation representing the lines of profile from which they were derived, and disposing said mounted section slices one above the other to represent successive layers of the earth.

Several of the supplemental advantages outlined above are obtained also with this second expression of the invention.

As a limit, this embodiment may be realized with slices so thin that they may be represented by the thickness of a horizontal sheet of film, and by a single sample of the seismic reflection signal; in this case the sequence of steps becomes plotting on a first sheet of film the first desired sample of each seismic trace from each seismic profile, such samples being disposed on the film in such a manner that they build up modulated horizontal lines representing the lines of profile on the location map, similarly plotting on a second sheet of film the second desired sample of each seismic trace from each seismic profile, similarly plotting on further sheets of film further desired seismic samples of each seismic trace from each seismic profile, and, superimposing said sheets of film, in registration.

A further aspect of the invention is concerned with the apparatus by which these methods may be realized.

A further and important aspect of the invention is concerned with a method for the direct location of hydrocarbons by the display of certain auxiliary seismic variables (including, in particular, reflection strength) on seismic sections arranged in a three-dimensional form as described above.

BRIEF DESCRIPTION OF THE DRAWINGS

FIG. 7 represents an extreme form of FIG. 6, in which the contour interval decreases to the thickness of a sheet of film and the seismic plotting becomes horizontal rather than vertical.

DESCRIPTION OF THE PREFERRED EMBODIMENT

Figure 1:
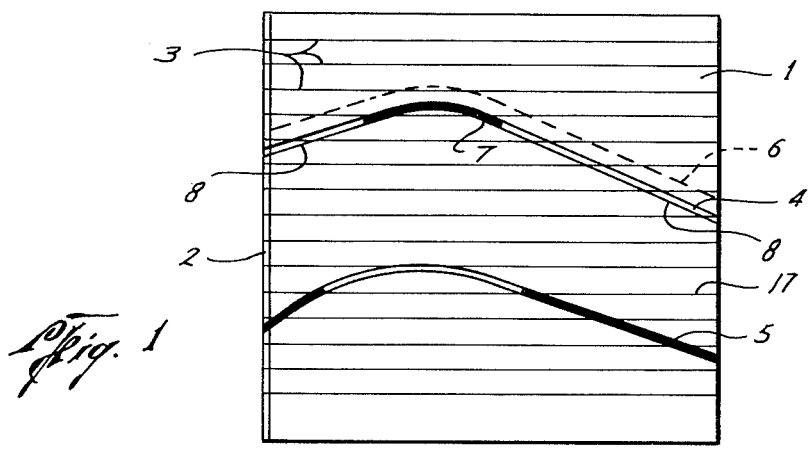
FIG. 1 represents a seismic section in idealized form.

In FIG. 1, a seismic cross-section 1 is shown which is prepared or constructed by plotting a plurality of vertical seismic traces such as an example trace 2 and by adding lines 3 of equal reflection time or depth. Two seismic reflections 4 and 5 are shown for simplicity of explanation, although a typical seismic section generally has more reflections, and reflection 4 is used as the basis for the following description. A zone of interpretational doubt above reflection 4 is suggested by dashed or phantom line 6. Although this line is shown generally parallel to reflection 4, it need not necessarily be so; in general the line 6 approaches reflection 4 where there is no doubt about the picking of this reflection, and diverges from the reflection 4 to encompass alternative picks where these exist.

The present invention is of particular utility where the seismic section 1 includes a color modulation representative of an auxiliary seismic variable formed in the manner described in copending United States application Ser. No. 300,718, filed Oct. 25, 1972, by the same inventor, and reflections 4 and 5 are here assumed to be modulated in color in such a manner to represent such an auxiliary variable. For example, the heavy part 7 of reflection 4 may be taken as a red modulation indicating large reflection strength, while the open parts 8 may be taken as a yellow modulation indicating medium reflection strength. Similar modulations are suggested on reflection 5; however, in this case the strong reflections are obtained from the flanks of the anticline and the weaker reflections from the crest. This is the usual situation, and the fact that the opposite occurs on reflection 4 may be interpreted, in conjunction with considerations of interval velocity and other seismic variables, as an indication of hydrocarbon accumulation under region 7.

For the purpose of this invention, the seismic section 1 may be at any scale and the traces 2 may be of any customary type. However, it is preferred that the scale be compressed horizontally relative to a natural scale, and that the traces 2 be of variable-density type with a superimposed color modulation as discussed above.

It is also desirable that each section should be plotted with its mirror image. The section and its mirror image are then affixed or mounted back-to-back, in registration, so that the same view of the geology may be obtained by viewing either side. For rigidity, a reinforcing sheet of thin card or metal or plastic material may be sandwiched between the section and its mirror image.

Figure 2:
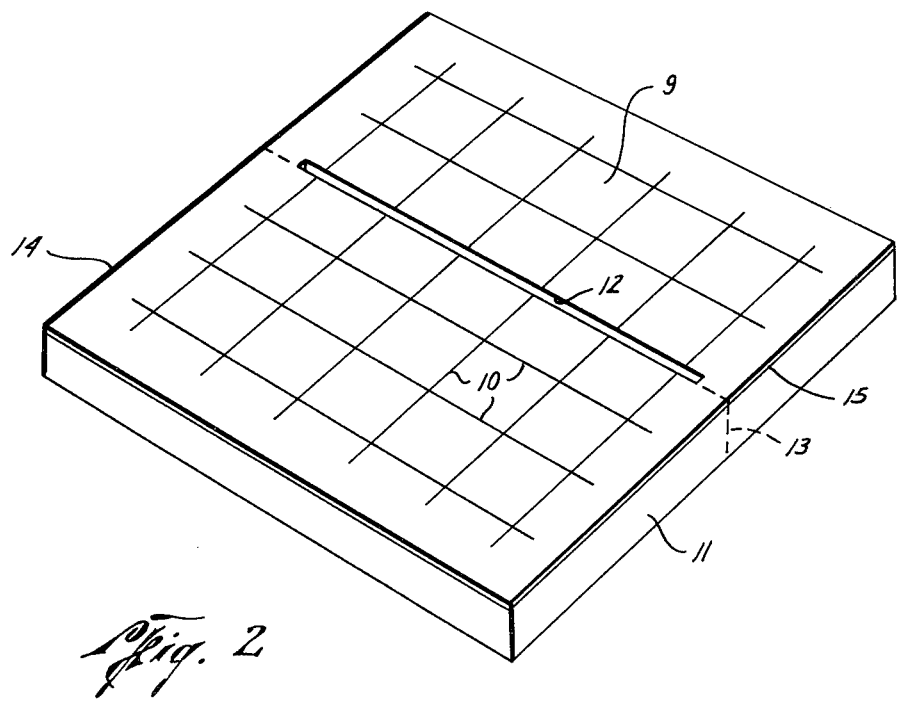
FIG. 2 represents a line location map mounted on a suitable base.

FIG. 2 depicts a location map 9 of a grid of lines of profile or profiles 10 constituting a seismic survey; in the case illustrated, the grid of profiles is approximately rectangular and evenly spaced, although other grids of profiles are also suitable, as is evident to those skilled in the art, and consequently the invention is not restricted to this case. The map 9 is constructed to match the horizontal scale of the sections, and is drawn or mounted on a support or baseplate 11 of metal or plastic or other suitable material. A slot 12 centered on each such line of profile 10 is milled or otherwise suitably formed to a substantially constant depth somewhat less than the thickness of the plate 11, and of a width sufficient to accept the appropriate section 1 prepared as described above. In some embodiments it may be desirable to be able to open the final model; in this case the baseplate 11 may be cut as suggested by dashed line 13 and hinged (for example, by affixing a flexible strip 14 to one edge of the plate). A sheet 15 of rubber or plastic material may be sandwiched between the map 10 and the baseplate 11 and a slot formed in the sheet 15 slightly narrower than that formed in the baseplate 11, so that a resilient grip is provided for the section 1 inserted into the slot 12.

Figure 3:
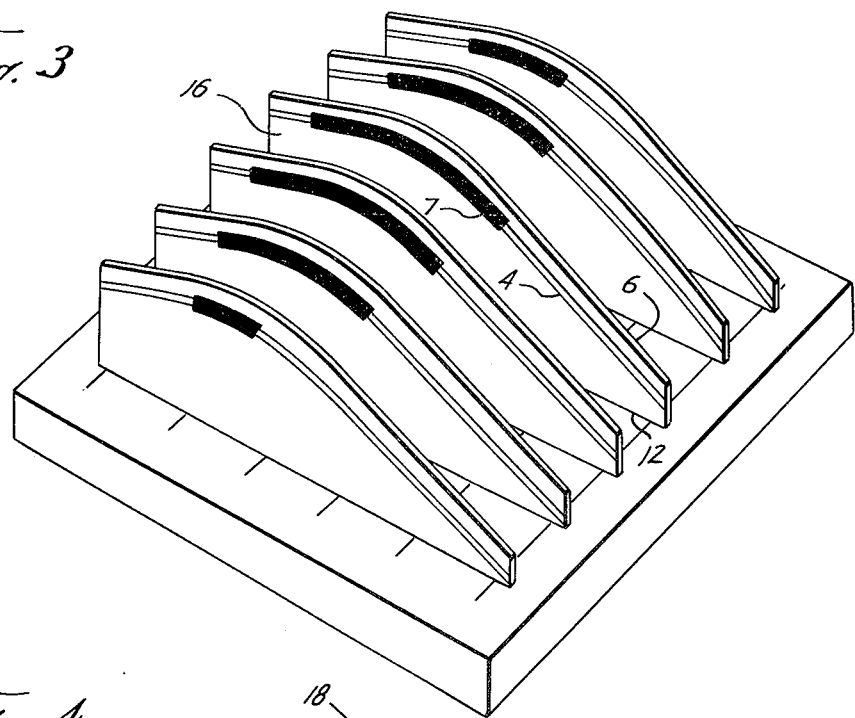
FIG. 3 represents a sectionalized model of one particular reflector, using only dip lines and incorporating a margin for interpretational error.

FIG. 3 shows the next stage in a first expression or embodiment of the invention particularly adapted to detail surveys. At 16 is shown the section 1 of FIG. 1, prepared as described above and having a portion thereof removed, such as by being cut, along the line 6 representing the upper limit of the zone of uncertainty in the pick of reflection 4, here assumed for the purposes of description to be the shallowest reflection of interest. It is then cut horizontally along a suitable horizontal line (17 in FIG. 1), and inserted into slot 12 in the baseplate of FIG. 2.

Succeeding operations depend in detail on the particular configuration of profiles and the nature of the zone of uncertainty. However, the following example sequence may be regarded as typical. The section for each dip line is prepared as above and inserted into its corresponding slot as shown generally in FIG. 3, with the lower edge of each section representing the same reflection time or depth. The relevance of the sum total of dip lines to the interpretation of each zone of uncertainty is then assessed, with particular regard to the color modulation, and with help from an inspection of important strike lines where necessary. The zone of uncertainty in the display may thus be reduced or eliminated by the present invention, after which the upper edge of the section may be cut to represent more closely the early part of the reflection 4.

Figure 4:
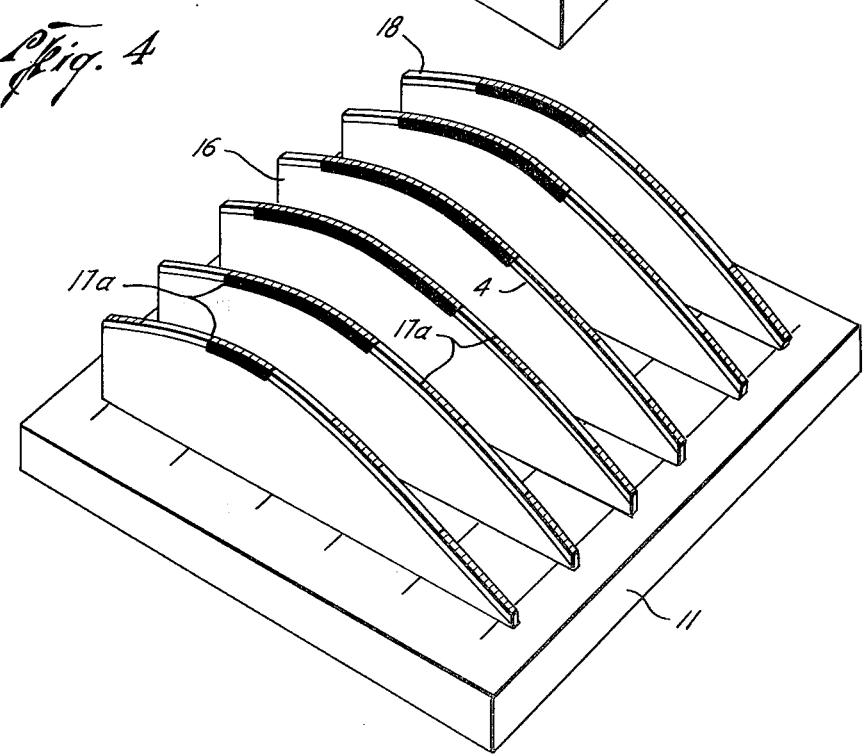
FIG. 4 represents the arrangement of FIG. 3 after removal of the said margin and after addition of contour markings.

FIG. 4 shows an idealized case where the three-dimensional display has allowed the elimination of the zone of uncertainty; each section 16 is cut along the upper limit of the reflection 4, so that each cut edge now contributes to a definition of the reflecting surface.

Also shown in FIG. 4 are contour marks 17a, representing lines of equal reflection time or depth; such contour marks may be made conveniently on the edge 18 of the section sandwich.

At this stage it is often beneficial to photograph the model, from several aspects, to obtain perspective views showing particular items of interest. It is found that the angle of view and the angle of lighting may be used to draw attention to such items, and to subdue the visual impact of those parts of the section which are not relevant.

Figure 5:
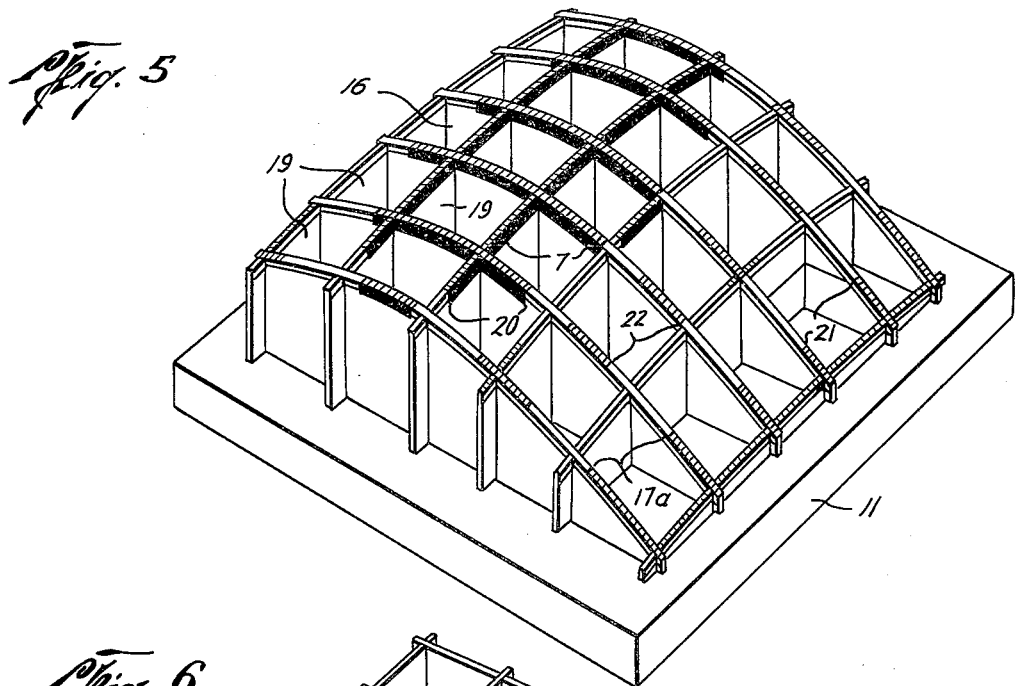
FIG. 5 represents the arrangement of FIG. 4 after addition of the sections obtained from strike lines.

In FIG. 5 is shown the stage of adding the strike sections 19, similarly trimmed to conform to the reflecting surface and similarly marked with contour indications. Sometimes it is found beneficial to take additional photographs of the model as these strike sections are added.

At the stage of FIG. 4 or FIG. 5, the areal significance of the color modulation 7 becomes evident. In FIG. 5 is illustrated the case where this modulation may be associated with the existence of hydrocarbons, and where the lower limit of the hydrocarbons is horizontal and coincident with contour marks 20.

Alternative methods of making the contour indications may be used. For example, pieces of transparent plastic material may be secured in the model, as suggested generally at 21, and their edges may be cut to represent the contour lines. Wires may be affixed between contour marks, as suggested generally at 22. Or the entire model may be filled with a transparent plastic material, with the material between the profiles scraped or sculpted into the interpolated form of the reflecting surface; in this case the contour lines may be drawn or scribed on this material.

The case last described allows a very simple measurement of the volume of hydrocarbons present, using the standard Archimedean technique of displacing a liquid by partial and/or total immersion of the model.

The techniques of the present invention acquire particular value when the seismic sections are migrated and converted from reflection time into depth. For example, each section may be so migrated and converted before its preparation for use in the model. Further, information on cross-dips, obtained either from intersecting profiles or from a three-dimensional recording technique, may be used to calculate the lateral offset of the reflecting points along the profile, for each reflection to be modelled; this information may then be used to twist or distort the seismic sections, or, preferably, to offset the slot 12 from the nominal position of the profile, as mapped on the surface, by an amount representing this calculated offset. In this way the position of the reflection as displayed by the model may be substantially correct in three-dimensional space.

The techniques described above are particularly well adapted to the need for detailing a known structure or stratigraphic trap. Models may be constructed for other reflecting surfaces (such as 5 in FIG. 1) above or below the main interest, and these models may be stacked one above the other to indicate their geological inter-relation.

Figure 6:
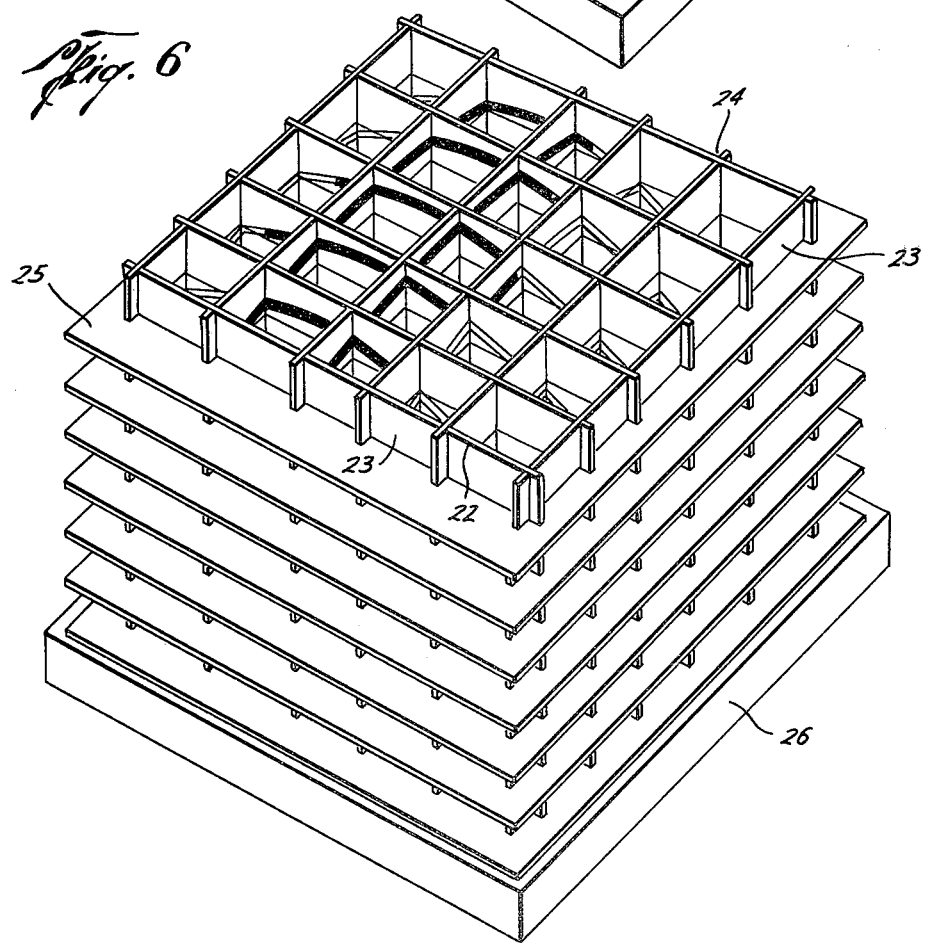
FIG. 6 represents an alternative form of model in which a three-dimensional arrangement of sections is formed between suitable contour planes.

FIG. 6 illustrates a second configuration adapted to the more general case. This does not concentrate on one or a few reflections, but displays the entire sectional sequence from datum to great depth. Each section is cut along a line of interest, which in the preferred embodiment may be lines 22 of constant reflection time or depth, to yield section slices 23; each such slice may represent for example, 0.1 or 0.2 seconds of reflection time. The set of sections corresponding to the same time or depth slice are then assembled in the manner of an old-fashioned egg-box, as shown generally at 24, and affixed to a support plate 25. Alternative methods of preparing and assembling the section slices to achieve a similar effect are encompassed within the scope of the invention. The operation is repeated for the section slices representing all other reflection time or depth intervals, the slice assembly being mounted, in each case, on a support plate 25. These support plates may be made of transparent plastic sheet, and may be furnished with a locating mechanism (not shown) by which they may be supported in vertical registration, one above the other, on a common baseplate 26.

It is apparent that with this mode of display each successive slice of reflection time or depth may be viewed in turn, thus facilitating studies of the three-dimensional inter-relation between geological markers of interest. Alternatively, each slice may be photographed in turn, from a suitable angle, and the photographs may be mounted at suitable vertical spacing to give an "exploded" perspective view of the earth.

A third configuration which constitutes a limiting case of the last arrangement is obtained when the thickness of each slice may be represented by that of a sheet of film. The complete model then becomes a stack of horizontal sheets of film, assembled in registration and capable of being opened like a book. FIG. 7 illustrates this configuration.

A sheet of film 27 is one of many constituting the stack 28. As a typical sheet in the stack, it is revealed by turning back the upper part 29 of the stack. On each sheet is carried a representation 30 of the profile map as a series of seismic traces; in contradistinction to conventional seismic traces, however, these represent the values of the seismic variables for a selected plane of interest, preferably the same reflection time or depth, as a function of position along the profile. For the sake of example, the sheet 27 is illustrated at 31 as representing the values of the seismic variables at time sample 1.260 seconds, all over the network of profiles. In some parts of some profiles such as these indicated at 32 and 33, the seismic reflection waveform may be positive, while in other parts such as those indicated at 34 and 35 it may be negative; a difference in the color modulation representing an auxiliary seismic variable is suggested by the difference in shading between parts 32 and 33.

Preferably this type of assembly is lighted both from above and below. It then facilitates a simultaneous appraisal of the reflection contours at any selected value of reflection time or depth, and the behaviour of any displayed reflection at times or depth below this; the latter option is made possible by looking through the open spaces such as 26 to the displays on the film sheets below.

As in the first configuration represented by FIG. 5, knowledge of cross-dips may be absorbed into the configurations of FIGS. 6 and 7 by local lateral displacement or migration of the positions of the profiles.

It is emphasized that the techniques described herein become particularly powerful when the display of the normal seismic reflection waveform in black-and-white is associated with the display of an auxiliary seismic variable in color, according to the disclosures of the aforesaid copending application.

The foregoing disclosure and description of the invention are illustrative and explanatory thereof, and various changes in the size, shape, and materials as well as in the details of the illustrated construction may be made without departing from the spirit of the invention.

I claim:

1. A method of forming a three-dimensional seismic display representing subsurface features of the earth as indicated by reflections along lines of profile in a seismic survey, comprising the steps of:
   a. preparing a plurality of seismic sections containing reflections;
   b. forming mirror images of the sections;
   c. removing a portion of the sections and the images to leave exposed edges related to a reflection of interest in the sections and images; and
   d. mounting the sections and their respective images back-to-back with each other at spatially related positions with respect to the other sections and their respective images according to the location of the lines of profile for the sections in the survey.

2. The method of claim 1, wherein the lines of profile in the seismic survey form a grid of intersecting lines, and wherein said step of mounting the sections and images at spatially related positions comprises:
   mounting the sections and their respective images at positions intersecting the other sections and their respective images according to the intersecting lines in the seismic survey grid.

3. The method of claim 1, wherein the seismic sections are obtained by processing data from the seismic survey and wherein the lateral offsets of the sections due to cross-dip are calculated in processing data, and wherein said step of mounting the sections and images at spatially related positions comprises the step of:
   mounting the sections and their respective images at positions offset from the nominal positions of their profiles with respect to each other by an amount represented by the calculated lateral offsets.

4. The method of claim 1, further including the step of:
   making contour indications on the sections.

5. The method of claim 4, wherein said step of making comprises the step of:
   marking contour lines on the sections.

6. The method of claim 5, wherein said step of marking comprises the step of:
   marking equal depth contour lines on the sections.

7. The method of claim 5, wherein said step of marking comprises the step of:
   marking equal time contour lines on the sections.

8. The method of claim 5, further including the step of:
   affixing wires between the marked contour lines.

9. The method of claim 4, wherein said step of making comprises the steps of:
   a. mounting a strip of material between the mounted sections; and
   b. cutting the edges of the strips of the material to represent the contour lines.

10. The method of claim 1, wherein said step of preparing a plurality of sections includes the steps of:
    a. plotting black-and-white traces representing reflected seismic signals in the sections; and
    b. superimposing a color modulation, representing an auxiliary seismic variable, on the plotted traces.

11. The method of claim 1, wherein said step of mounting comprises steps of:
    a. forming slots in a support base at positions spatially related with respect to each other according to the location of the lines of profile; and
    b. inserting in the slots so formed the sections associated with the respective lines of profile.

12. The method of claim 1, further including the step of:
    inserting a reinforcing sheet between the sections and their respective mirror images prior to said step of mounting.

13. A three-dimensional seismic display representing subsurface features of the earth as indicated by reflections in seismic sections along lines of profile in a seismic survey, comprising:
    a. a support adapted to receive the seismic sections thereon at positions spatially interrelated to lines of profile for sections in the survey;
    b. a plurality of seismic sections, each of said sections indicating thereon reflections in the seismic survey taken along the line of profile for said section, and each of said sections further being mounted at a position on said support spatially interrelated to the line of profile for said section in the survey; and
    c. at least one of said plurality of seismic sections comprising:
       1. a first seismic section indicating reflections in the seismic survey taken along the line of profile; and
       2. a second seismic section in the form of a mirror image of said first seismic section, said second seismic section being mounted in back-to-back registry with said first seismic section.

14. The display of claim 13, wherein said support comprises:
    a support having a plurality of slots formed therein at said positions spatially interrelated to lines of profile, each of said slots receiving a portion of one of said sections associated with the line of profile for which said slot was formed to mount said sections to said support.

15. The display of claim 13, further including:
    means mounted with said support for gripping said sections in place with respect to said support.

16. The display of claim 13, further including:
    means mounted between said first seismic section and said second seismic section for reinforcing said sections.

17. A method of forming a three-dimensional seismic display representing subsurface features of the earth as indicated in seismic sections along lines of profile in a seismic survey, comprising the steps of:
    a. preparing a plurality of seismic reflection sections;
    b. forming mirror images of the sections;
    c. cutting the sections and their respective images into slices along lines of interest;
    d. mounting the cut slices of sections and their respective images for a common line of interest in back-to-back relation at positions spatially related with respect to the other cut slices of sections and images for a common line of interest according to the location of the lines of profile for the sections in the survey; and
    e. disposing the mounted cut section slices and images for different lines of interest one above the other to form a three-dimensional seismic display of subsurface features of the earth.

18. The method of claim 17, wherein lines of reflection time are the lines of interest, and wherein said step of cutting comprises the step of:

cutting the sections into slices along lines of equal reflection time.

19. The method of claim 17, wherein said lines of reflection depth are the lines of interest, and wherein said step of cutting comprises the step of:

cutting the sections into slices along lines of equal reflection depth.

20. The method of claim 17, further including the step of:

inserting support plates between the mounted section slices during said step of disposing.

21. A three-dimensional seismic display representing subsurface features of the earth as indicated in seismic sections along lines of profile in a seismic survey, comprising:

a plurality of seismic reflection sections formed into slices along lines of interest, each of said seismic reflection sections having a mirror image thereof mounted in back-to-back relation therewith, each of said slices of said sections and images for a common line of interest being mounted with respect to the other sections and images according to the location of the lines of profile for the sections in the survey, said mounted section slices and images being disposed one above the other to represent subsurface features of the earth.

22. The display of claim 21, wherein lines of reflection time are the lines of interest, and wherein:

said plurality of seismic reflection sections comprises a plurality of seismic reflection sections formed into slices along lines of equal reflection time.

23. The display of claim 21, wherein lines of reflection depth are the lines of interest, and wherein:

said plurality of seismic reflection sections comprises a plurality of seismic reflection sections formed into slices along lines of equal reflections depth.

24. The display of claim 23, further including:

a support plate between each of the mounted section slices for supporting said mounted section slices.

25. A method of making a sectionalized model of the earth, comprising the steps of:

a. preparing a plurality of seismic reflection sections at a suitable scale;

b. forming mirror images of the sections;

c. cutting said sections and their respective images into slices along lines of equal reflection time or equal reflection depth;

d. disposing and securing said section slices and their respective images back-to-back with respect to each other and in a spacial inter-relation with respect to the other section slices and images representing the lines of profile from which they were derived; and e. disposing said mounted section slices and their respective images one above the other to represent successive layers of the earth.

26. A method of making a sectionalized model of the earth, comprising the steps of:

a. preparing a plurality of seismic reflection sections at a suitable scale;

b. forming mirror images of the sections;

c. cutting said sections and their respective images in a manner such that each cut edge is related to the observed configuration of a particular seismic reflection; and d. disposing and securing said section and their respective images in a spatial inter-relation with respect to each other representing the lines of profile from which they were derived.

* * * * *

UNITED STATES PATENT AND TRADEMARK OFFICE
CERTIFICATE OF CORRECTION

PATENT NO. : 3,931,609
DATED : January 6, 1976
INVENTOR(S) : Nigel A. Anstey

It is certified that error appears in the above-identified patent and that said Letters Patent are hereby corrected as shown below:

On the cover page, the name of the assignee should be:

"SEISCOM DELTA INC."

Signed and Sealed this sixth Day of April 1976

[SEAL]

Attest:

RUTH C. MASON
*Attesting Officer*

C. MARSHALL DANN
*Commissioner of Patents and Trademarks*